United States Patent [19]

Smith, Jr. et al.

[11] 4,396,577
[45] Aug. 2, 1983

[54] COBALT-PALLADIUM-SILICON-BORON BRAZING ALLOY

[75] Inventors: Murray S. Smith, Jr., Cincinnati; Mark S. Hilboldt, Fairfield; Pracheeshwar S. Mathur, Montgomery, all of Ohio

[73] Assignee: General Electric Company, Cincinnati, Ohio

[21] Appl. No.: 310,270

[22] Filed: Oct. 9, 1981

[51] Int. Cl.$^3$ .................. C22C 30/00; C22C 5/00; C22C 19/07
[52] U.S. Cl. .................. 420/580; 420/435; 420/463
[58] Field of Search ............. 75/170, 172 R, 244, 75/247, 254, 255, 134 N, 134 F

[56] References Cited

U.S. PATENT DOCUMENTS

| | | | |
|---|---|---|---|
| 2,856,281 | 10/1958 | Cremer et al. | 75/170 X |
| 3,053,652 | 9/1962 | Mobley et al. | 75/171 |
| 3,089,769 | 5/1963 | Huschke, Jr. et al. | 75/171 |
| 3,155,499 | 4/1962 | Mobley | 75/134 N |
| 3,764,307 | 10/1973 | Barb et al. | 75/170 |
| 3,853,548 | 12/1974 | Fairbanks et al. | 75/171 |

FOREIGN PATENT DOCUMENTS 886591  1/1962  United Kingdom ............. 75/172 R

*Primary Examiner*—L. Dewayne Rutledge
*Assistant Examiner*—David A. Hey
*Attorney, Agent, or Firm*—Lee H. Sachs; Derek P. Lawrence

[57] ABSTRACT

A brazing alloy, particularly suited for use in high temperature gas turbine engines has a composition range which exhibits X-ray inspection capability, adequate stress rupture properties, ductility and oxidation resistance. The brazing alloy composition consists essentially of about 25–95% Pd, up to about 5% Si, up to about 3.5% B, balance being Co and incidental impurities, all percentages being by weight. The brazing alloy is capable of brazing in the 1800°–2100° F. temperature range and is less costly than current Au-bearing brazing alloys currently in use for brazing in this temperature range.

11 Claims, No Drawings

COBALT-PALLADIUM-SILICON-BORON BRAZING ALLOY

CROSS REFERENCE TO RELATED APPLICATION

Related to this application are co-pending and concurrently filed applications, Ser. No. 310,338 and Ser. No. 310,339, all filed on Oct. 9, 1981 and assigned to the assignee of the present invention.

BACKGROUND OF THE INVENTION

1. Field of the Invention

The present invention relates to brazing alloys, and more particularly, to brazing alloys of the Co (cobalt)-Pd (palladium)-Si (silicon)-B (boron), Co-Pd-Si and Co-Pd-B systems suitable for brazing in the 1800°-2100° F. temperature range.

2. Description of the Prior Art

Application of various metals and their alloys for use as structural or operational components in high temperature operating systems such as turbomachinery for use in gas turbine engines often requires joining to form a sound, structural joint. Joining can be accomplished in a number of ways, the more common and effective being welding or brazing.

During welding, a portion of the members being joined are melted and resolidified. A weld joint can have a grain structure significantly different from the material joined and will generally have reduced mechanical properties as a result of the melting and solidification. However, during brazing, a metal or alloy generally referred to as the brazing alloy, is placed between closely fitted members to be joined, and heated to a temperature, generally referred to as the brazing temperature, sufficient to cause melting of the brazing alloy but not the alloy of the members. The brazing alloy subsequently is resolidified during cooling. A bond results principally from the combination of heat and interdiffusion of the brazing alloy with the alloy of the structural members being joined. The brazing alloy is selected to provide a sound bond which results in optimum high temperature mechanical properties across the joint.

Various factors are considered in the development, selection, and application of a brazing alloy. These factors include processing, service conditions, physical and mechanical properties of the brazing alloy and economic considerations. These factors are well known and practiced in the art.

Many aircraft gas turbine components are fabricated using brazing techniques. Most generally, the nickel-base superalloys, cobalt base alloys or various high strength steels are selected as the structural materials of such components. A number of materials thus selected require that brazing be performed in the temperature range of from about 1800° F. to about 2100° F. to provide sound joints while maintaining high temperature mechanical properties.

One high-temperature cobalt-base alloy currently used as brazed structural members in high-temperature applications is commercially availabe as X-40 Alloy having a nominal composition of about 25.0% Cr (chromium), 10.5% Ni (nickel), 7.5% W (tungsten), 2.0% Fe (iron), 1.0% Mn (manganese), 1.0% Si (silicon), 0.5% C (carbon), balance Co (cobalt), and incidental impurities. As used herein, all percentages are weight percentages unless otherwise noted. Such alloy has a maximum service temperature in the range of about 1950° F. This alloy, therefore, requires a higher melting temperature braze for successful service. Other alloys such as nickel-base superalloys or high strength steels may require lower temperature brazing alloys to avoid detrimental effects due to overaging or grain growth of the structural materials being joined.

Brazing alloys used previously within a brazing temperature range of about 1800°-2100° F. have included the gold-bearing brazing alloys, such as, for example, 82% Au (gold), 18% Ni (hereinafter referred to as 82-18) and 20.5% Au, 66.5% Ni, 5.5% Cr, 2.2% Fe, 3.3% Si (silicon), 2.1% B (hereinafter referred to as Au-6). These brazing alloys have application limitations based on their strength capability, their service temperature limit, and their ductility. The large amounts of gold present in these alloys results in very high cost which makes their selection and use unattractive.

Other, less expensive brazing alloys available for brazing in the temperature range of 1800°-2000° F. include those alloys which contain substantial amounts of silver, titanium, manganese, copper or phosphorus. Such brazing alloys are not attractive for use in high-temperature gas turbine applications for various reasons. For example, silver-containing brazing alloys are very corrosive to nickel-base alloys at high temperatures experienced in aircraft gas turbines. Titanium-containing brazing alloys lack high temperature service capabilities. Manganese and copper-containing brazing alloys exhibit poor oxidation resistance above about 1000° F. Finally, the phosphorus-containing nickel-base brazing alloys produce excessive structural metal erosion and joints which are excessively brittle. Such brazing alloys have limited usefulness for high temperature applications.

Accordingly, a need exists for a less expensive, gold-free brazing alloy suitable for brazing certain high-temperature structural materials in the same temperature range as the previously discussed gold-containing brazing alloys. Additionally, the improved brazing alloy must have a better combination of strength and ductility as well as comparable or higher operating service temperature than currently available brazing alloys.

BRIEF SUMMARY OF THE INVENTION

It is a principal object of this invention to provide an improved brazing alloy having a brazing temperature in the range of 1800°-2100° F. to replace currently available gold-bearing brazing alloys.

It is another object of this invention to provide such a brazing alloy with an improved combination of higher mechanical properties, along with adequate ductility and resistance to oxidation.

An additional object of this invention is to provide such a brazing alloy capable of manufacture in the form of powder, tape, or other form suitable for various brazing applications.

It is yet another object of this invention to provide such a brazing alloy capable of application as a brazed joint between structural members by any of a variety of heating application means, and being suitable for application in original structural article manufacture as well as in subsequent repair procedures.

These and other objects and advantages will be more clearly understood from the following detailed description and specific examples which are intended to be typical of, rather than in any way limiting on, the scope of the present invention.

Briefly, the present invention provides a unique combination of alloying elements which results in an improved, less expensive brazing alloy having a brazing temperature in the range of 1800°-2100° F. for replacement of current, gold-containing brazing alloys. The brazing alloy in its broad form consists essentially of 25-95% Pd, up to 5% Si, up to 3.5% B, balance being Co and incidental impurities. Thus, the brazing alloy of the present invention does not contain any of the adverse elements previously discussed, i.e., silver, titanium, manganese, copper or phosphorus, other than impurity levels.

The brazing alloy of the present invention has been found to be much less expensive than current gold-containing brazing alloys that have similar brazing temperatures. For example, the current cost of Au-6 and 82-18 brazing alloys is approximately 2 times and 7 times, respectively, the current cost of the brazing alloy of the present invention. In addition, the brazing alloy of the present invention develops comparable or improved strength along with adequate ductility, improved oxidation resistance, and comparable or increased service temperature as compared to currently used gold-bearing brazing alloys.

The brazing alloy of the present invention is capable of being manufactured in the form of powder, tape, and viscous mixture products enabling a wide range of applications.

The invention, as well as other objects, advantages and capabilities thereof, will be better understood from the following description and appended claims taken in conjunction with specific examples to follow and other aspects of the invention discussed above.

DESCRIPTION OF THE PREFERRED EMBODIMENTS

The combination of Co, Pd, Si, and B, previously discussed provides unexpected advantages as a brazing alloy in the 1800°-2100° F. temperature range when alloyed within the ranges of the present invention. Such a brazing alloy has heretofore been unrecognized.

The present invention will be more fully understood from the following discussion of representative examples of alloy forms studied during the evaluation of the present invention. Such examples are not intended to be limitations on the scope of this invention.

The following table lists the composition of selected forms of such alloys within the range of and made and tested in connection with the present invention.

It will be understood that the liquidus temperature as shown in the table is that temperature for a given brazing alloy composition above which all the metal is liquid. Generally, the brazing temperature of an alloy is selected to be approximately 50° F. higher than the liquidus temperature. The increased temperature is chosen to assure that all of the alloy will be molten and that adequate flow within the brazed joint will be realized, so that a sound joint can be obtained. Additionally, the higher temperature is chosen to allow for normal temperature variations within production-type furnaces.

TABLE

BRAZING ALLOY COMPOSITION

| Alloy Example | Percent by Weight | | | | Liquidus Temperature (°F.) |
|---|---|---|---|---|---|
| | Co | Pd | Si | B | |
| 110 | 37.5 | 59.5 | 2.5 | 0.5 | <1965 |
| 101 | 7.0 | 90.0 | 3.0 | — | <2025 |
| 102 | 17.0 | 80.0 | 3.0 | — | <1975 |
| 103 | 15.5 | 80.0 | 4.5 | — | <1950 |
| 105 | 35.3 | 60.2 | 4.5 | — | <2050 |
| 106 | 19.0 | 80.0 | — | 1.0 | >1925 |
| 107 | 37.1 | 61.4 | — | 1.5 | <1800 |
| 108 | 68.0 | 30.0 | — | 2.0 | >1925 |

The brazing alloy of the present invention includes Co for its compatibility with nickel-base superalloys, high strength steels and cobalt-base alloys generally joined by brazing in the desired temperature range provided by the alloy of the present invention. Palladium is chosen because it readily forms a solid solution with many other metals, which is desirable for brazing alloys. Likewise, Pd is similar to gold in its alloying characteristics. This similarity makes it a viable substitution for gold in high-temperature brazing alloys such as those previously discussed.

The presence of Pd in the alloy of the present invention will provide a brazing alloy with sufficient density to allow for detection of braze voids by X-ray inspection techniques. Such voids within a brazed joint can lead to an unsound joint and are to be specifically avoided. X-ray inspectability of brazed joints had been an advantage previously offered only by the Au-bearing brazing alloys.

An alloy of Pd and Co will form a solid solution with a liquidus temperature, i.e., that temperature above which all of the metal is liquid, of about 2215° F. when alloyed together, for example, in the ratio of about 60 Pd-40 Co. The continuous series of solid solutions thus formed are similar to the Ni-Pd system described in co-pending application Ser. No. 310,339, filed Oct. 9, 1981, assigned to the assignee of this invention. The amount of Pd present can be varied from about 25% to about 95% in the presence of other elements associated with the present invention. The amounts of Co and Pd selected within the scope of the present invention will depend upon the desired strength and ductility levels required. Generally, an increase in the amount of Pd present will result in increased ductility, but will also result in an increased liquidus temperature of the brazing alloy within the Co-Pd-Si-B system.

Si and B are added to function as temperature depressants, reducing the melting point of the brazing alloy. To provide a brazing alloy with a melting point in the desired range while providing adequate ductility and maintaining other desired properties, a careful balance of alloy additions must be maintained. Generally the presence of Si or B will result in reduced ductility of the brazing alloy, but in combination with the elements of the present invention, in the ranges defined, adequate ductility is achieved. The presence of Si below about 2% will have little temperature depressant effect. Above about 5% Si in the present alloy will cause unwanted reactions during the brazing cycle in the presence of Co, Pd, and B, will not allow production of adequate braze joints, and will reduce the structural integrity of the brazed joints.

Boron has a more marked effect on the depression of the melting point of the brazing alloy than does Si. As can be seen in the table, the liquidus temperatures of Alloys 105 and 107 vary significantly. The basic difference is the amount of Si and B present: Alloy 105 with 4.5% Si has a liquidus temperature of <2050° F. while Alloy 107 with 1.5% B has a liquidus temperature of <1800° F. Also shown in the table, the liquidus temperature for a given Co and Pd composition is reduced by the presence of increased Si. A brazing alloy with a given or desired brazing temperature can be provided by varying the ratio of the elements present. In the alloy of the present invention, boron can be selected in amounts up to about 4%. Above this level, in combination with other elements of the brazing alloy, the result will be a brazing temperature which is too low for intended service. Additionally, B above about 4% will adversely affect the ductility of the brazing alloy.

The alloy of the present invention is easily adapable to production in powder, tape, and viscous mixture products. Alloys 106, 107 and 108 are also easily produced as wire or foil products. Particularly, a brazing wire product can be produced, for example, up to about 0.040" in diameter, in a process generally associated with wire filament manufacture. In producing brazing wire by this method, the alloy is prepared without B during the filament process and then B later is added to the wire product through a diffusion process known as boronizing. Foil products can also be produced using the boronizing process as well by a new rapid solidification process which produces a foil referred to as amorphous foil. The boronizing process is a distinct advantage of this alloy as compared to the Si-containing alloys. Silicon, and any of the other common depressants, other than B, used in brazing alloys, cannot generally be diffused in a manner similar to B. Thus, a variety of brazing alloy forms are available for a wide variety of applications.

All brazing alloys associated of the present invention have liquidus temperatures in the range of about 1800°-2100° F., and have good flow and wetting characteristics. No erosion or base metal attack is observed with their use; thus, the structural integrity of the material being joined is maintained. The brazing alloy of the present invention has adequate strength, ductility, and oxidation resistance.

The brazing alloy of this invention has demonstrated excellent flow and wetability characteristics with no evidence of erosion or other attack of the structural metals tested. The alloy of this invention is less costly than currently used gold-containing brazing alloys in the same temperature range and offers X-ray inspection capability of the brazed joints.

Although the alloy of the present invention has been described in connection with specific examples and embodiments, it will be understood by those skilled in the art the variations and modifications of which this invention is capable without departing from its broad scope.

What is claimed is:

1. An improved brazing alloy consisting essentially of, by weight, 25–95% Pd, up to 5% Si, up to 3.5% B, balance being Co and incidental impurities, the Si, when selected, being at least about 2%, and the B, when selected, being at least about 0.5%, said brazing alloy having a liquidous temperature in the range of about 1800°–2100° F. and being characterized by the substantial absence of Ag, Ti, Mn, Cu, and P.

2. The brazing alloy of claim 1 in which the Co is 37–38%, Pd is 59–60%, Si is 2–3% and B is 0.5 to 1%, said brazing alloy having a liquidus temperature of about 1965° F.

3. A brazing alloy of claim 1 in which the Co is 19–68%, Pd is 30–80% and B is up to about 2%, the alloy being further characterized by the substantial absence of Si.

4. The brazing alloy of claim 3 in which the Co is about 19%, Pd is about 80%, and B is up to about 1%, said brazing alloy having a liquidus temperature in excess of about 1925° F.

5. The brazing alloy of claim 3 in which the Co is about 68%, Pd is about 30%, and B is up to about 2%, said brazing alloy having a liquidus temperature in excess of about 1925° F.

6. The brazing alloy of claim 1 in which the Co is 7–35%, Pd is 60–90%, and Si is 3–5%, the alloy being further characterized by the substantial absence of B.

7. The brazing alloy of claim 6 in which the Co is 15–17.5%, Pd is about 80%, and Si is 2.5–5%, said brazing alloy having a liquidus temperature in excess of about 1950° F.

8. The brazing alloy of claim 6 in which the Co is about 7%, Pd is about 90% and Si is about 3%, said brazing alloy having a liquidus temperature in excess of about 2000° F.

9. The brazing alloy of claim 1 wherein said alloy is in the form of powder.

10. The brazing alloy of claim 1 wherein said alloy is in the form of a brazing foil.

11. The brazing alloy of claim 3 wherein said alloy is in the form of a wire.

* * * * *